(12) United States Patent
Lee

(10) Patent No.: US 8,149,253 B2
(45) Date of Patent: Apr. 3, 2012

(54) DISPLAY, TIMING CONTROLLER AND DATA DRIVER FOR TRANSMITTING SERIALIZED MULTI-LEVEL DATA SIGNAL

(75) Inventor: Yong-Jae Lee, Yongin-si (KR)

(73) Assignee: Anapass Inc., Seoul (KR)

( * ) Notice: Subject to any disclaimer, the term of this patent is extended or adjusted under 35 U.S.C. 154(b) by 771 days.

(21) Appl. No.: 12/293,794

(22) PCT Filed: Jun. 20, 2006

(86) PCT No.: PCT/KR2006/002351
§ 371 (c)(1),
(2), (4) Date: Sep. 19, 2008

(87) PCT Pub. No.: WO2007/108574
PCT Pub. Date: Sep. 27, 2007

(65) Prior Publication Data
US 2010/0225620 A1  Sep. 9, 2010

(30) Foreign Application Priority Data

Mar. 23, 2006  (KR) .................. 10-2006-0026565
May 10, 2006  (KR) .................. 10-2006-0041920

(51) Int. Cl.
*G09G 5/10* (2006.01)
*G09G 3/36* (2006.01)

(52) U.S. Cl. .............. 345/691; 345/84; 345/87; 345/88; 345/204; 345/690

(58) Field of Classification Search ................. 345/55, 345/60, 63, 74.1, 75.2, 76, 77, 82, 83, 87, 345/88, 98, 99, 204, 690, 691
See application file for complete search history.

(56) References Cited

U.S. PATENT DOCUMENTS

| 5,818,409 | A | 10/1998 | Furuhashi et al. | |
|---|---|---|---|---|
| 6,252,571 | B1 | 6/2001 | Nomura et al. | |
| 6,999,056 | B1* | 2/2006 | Kim et al. | 345/99 |
| 7,193,623 | B2* | 3/2007 | Moon | 345/205 |
| 7,227,522 | B2* | 6/2007 | Fujimoto et al. | 345/87 |
| 7,382,345 | B2* | 6/2008 | Hong | 345/99 |
| 7,564,450 | B2* | 7/2009 | So | 345/204 |
| 2002/0080107 | A1* | 6/2002 | Fujimoto et al. | 345/87 |

(Continued)

FOREIGN PATENT DOCUMENTS

JP  2002-116738  4/2002

(Continued)

*Primary Examiner* — My-Chau T Tran
(74) *Attorney, Agent, or Firm* — Sherr & Vaughn, PLLC

(57) ABSTRACT

The present invention relates to a display, a timing controller and a data driver for transmitting a serialized multi-level data signal, and more particularly to a display, a timing controller and a data driver for transmitting a serialized multi-level data signal for reducing the number of wirings between the timing controller and the data driver, and for reducing an EMI component. The display of the present invention comprises a display panel, a scan driver, a timing controller and a plurality of data drivers, wherein the timing controller transmits a transmission signal including a serialized data signal to one of the plurality of the data drivers, wherein a level of the data signal is selected from at least four different levels according to a value of a data having a length of at least two bits, and wherein the data driver restores the data from the transmitted transmission signal.

15 Claims, 9 Drawing Sheets

U.S. PATENT DOCUMENTS

| | | | |
|---|---|---|---|
| 2003/0043100 A1* | 3/2003 | Moon | 345/87 |
| 2003/0222839 A1 | 12/2003 | Lee | |
| 2005/0140619 A1* | 6/2005 | Hong | 345/87 |
| 2005/0264586 A1 | 12/2005 | Kim | |
| 2008/0246752 A1* | 10/2008 | Lee | 345/213 |
| 2008/0246755 A1* | 10/2008 | Lee | 345/214 |

FOREIGN PATENT DOCUMENTS

| | | |
|---|---|---|
| JP | 2005-338763 | 12/2005 |

* cited by examiner

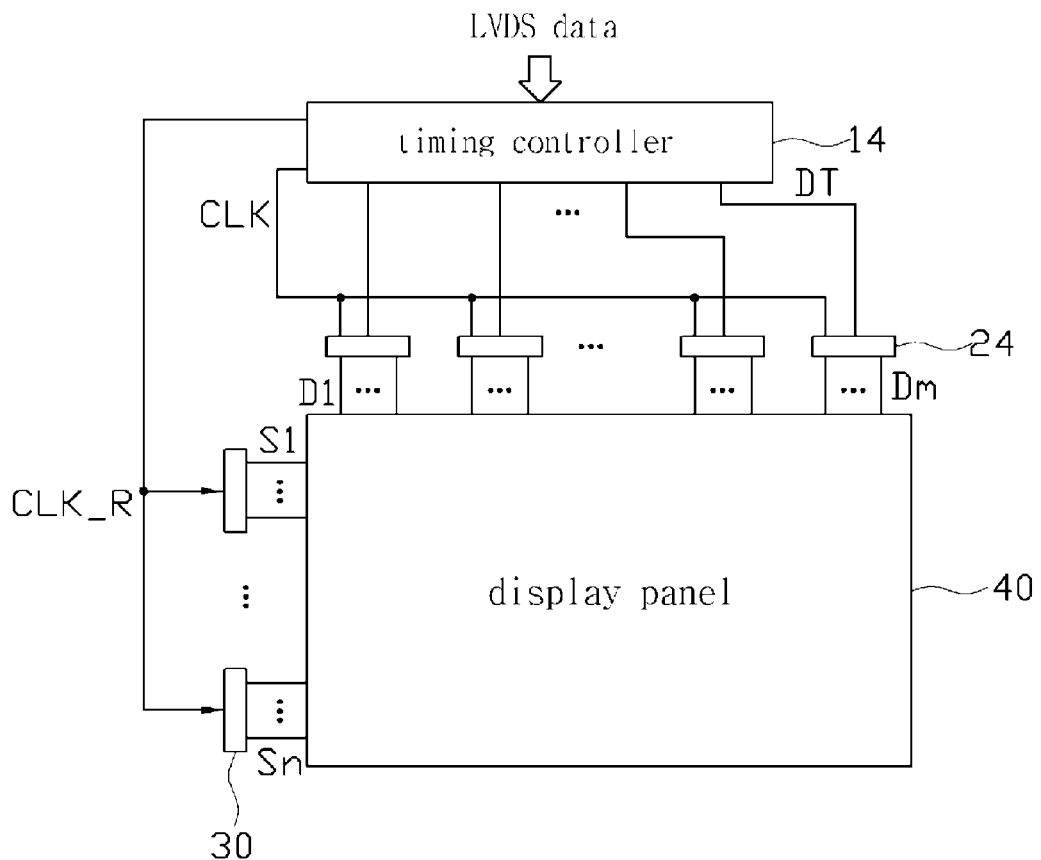
[Fig. 5]
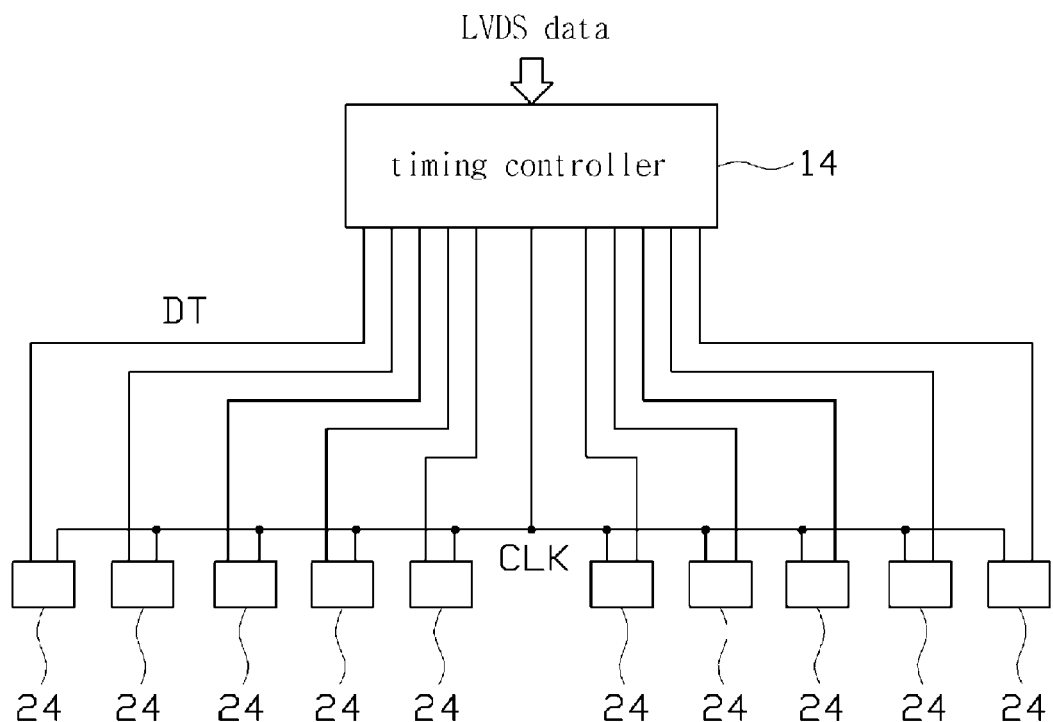
[Fig. 6]

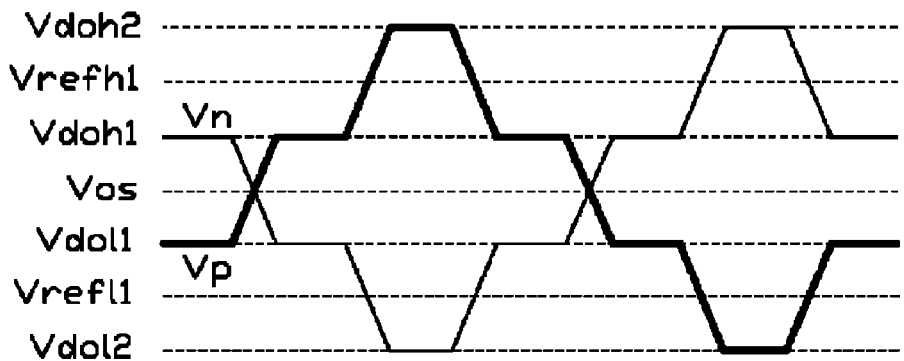
[Fig. 7]
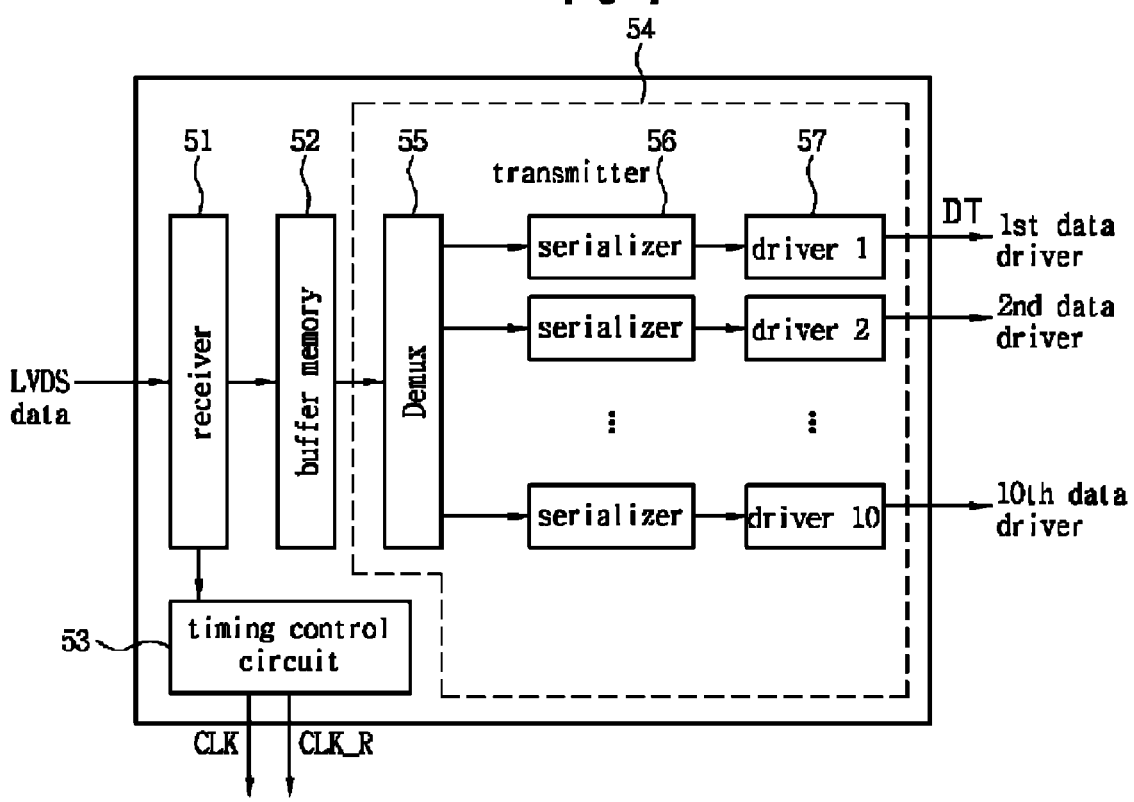
[Fig. 8]

[Fig. 9]
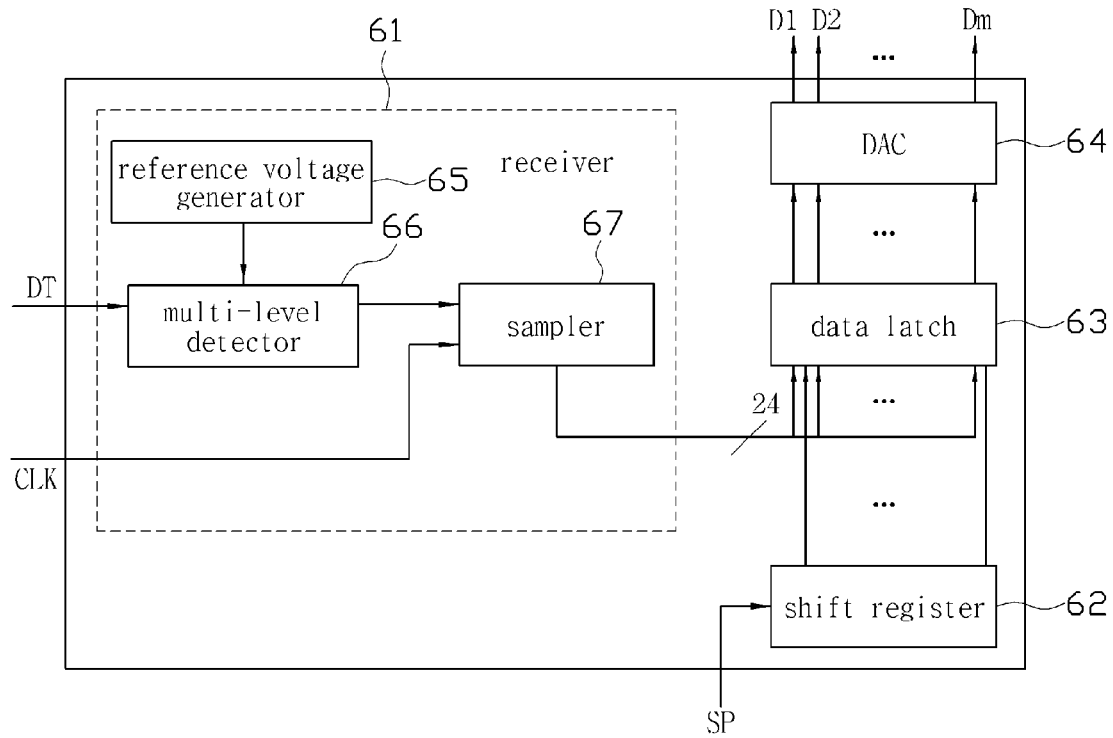
[Fig. 10]
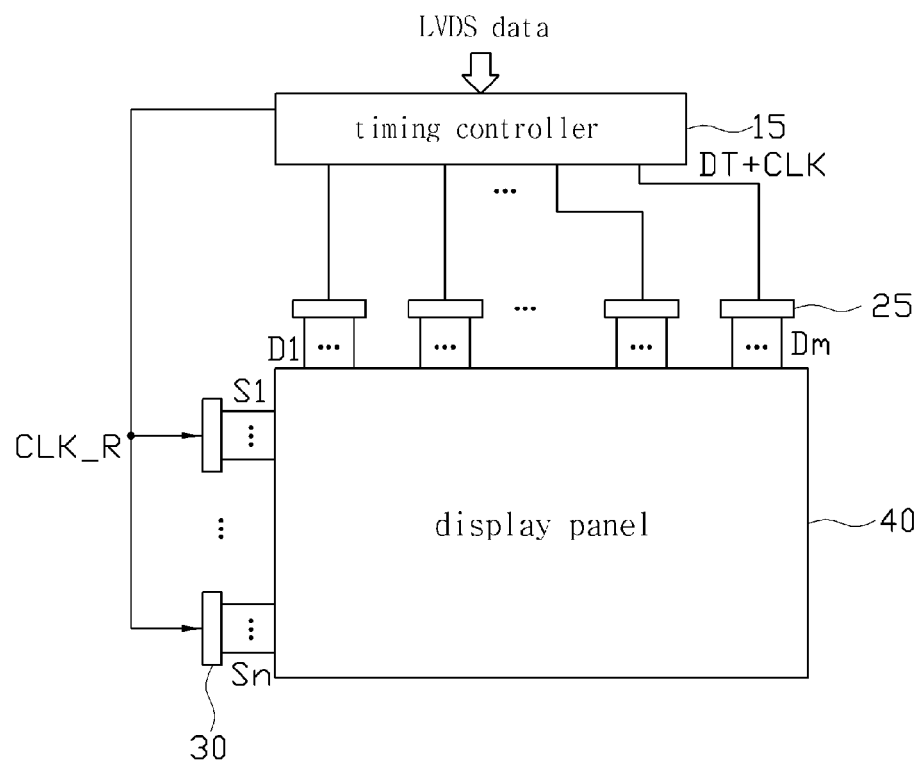

[Fig. 11]
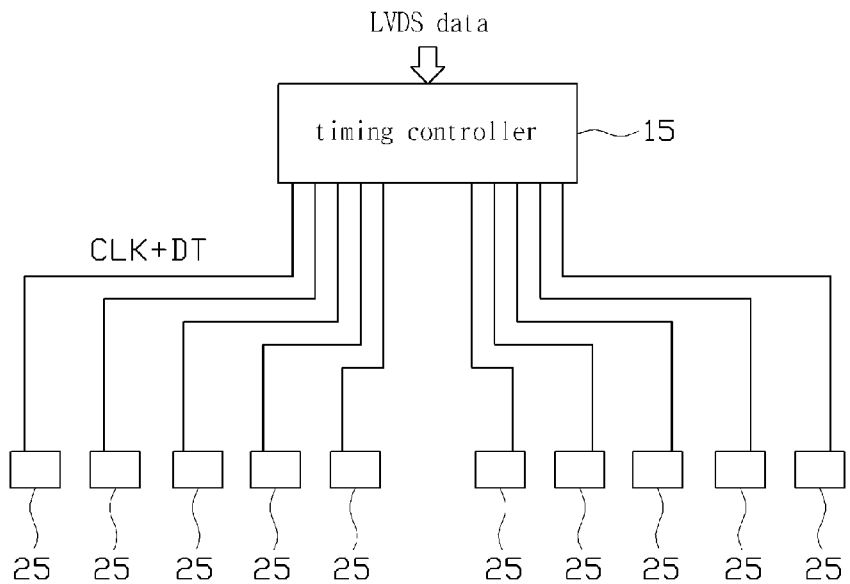
[Fig. 12]
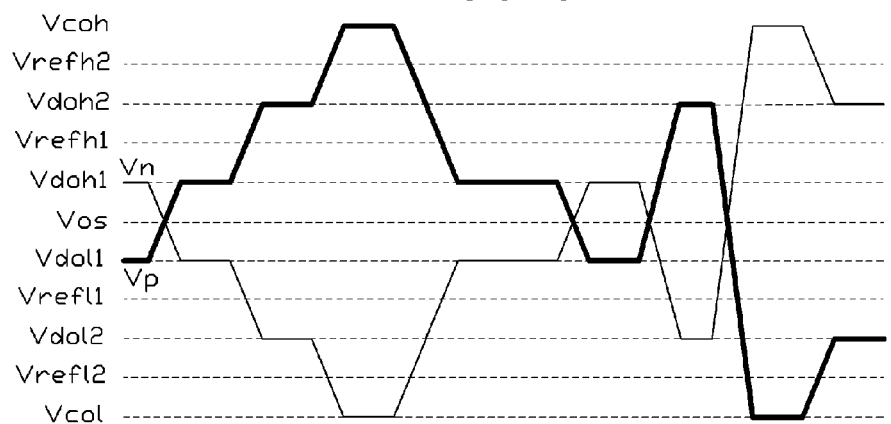
[Fig. 13]
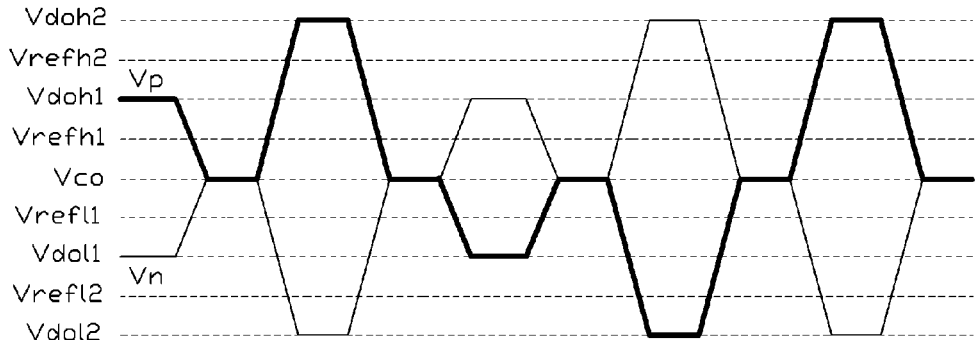

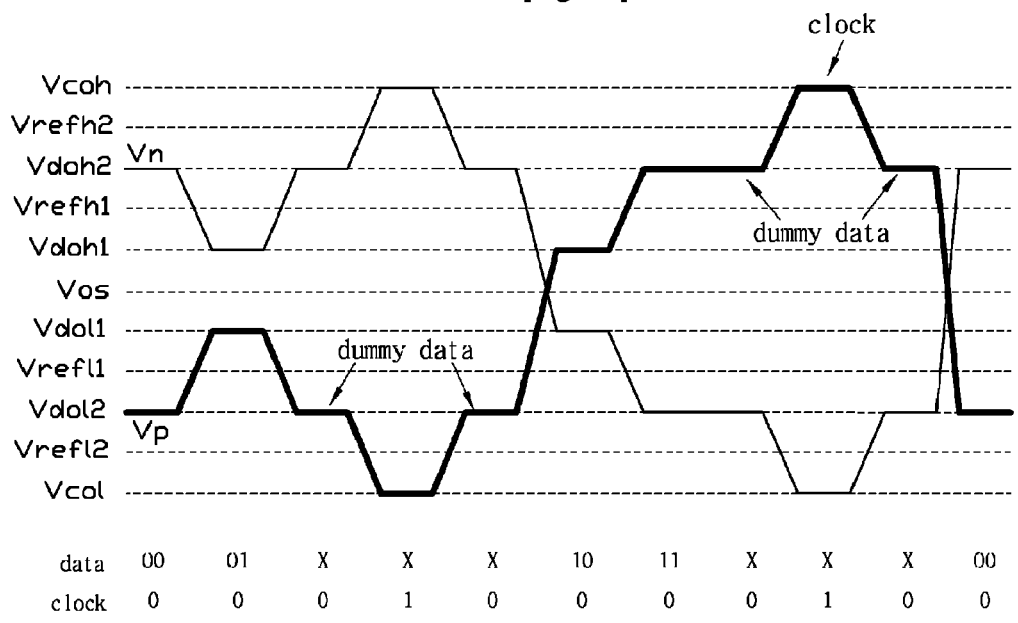
[Fig. 14]
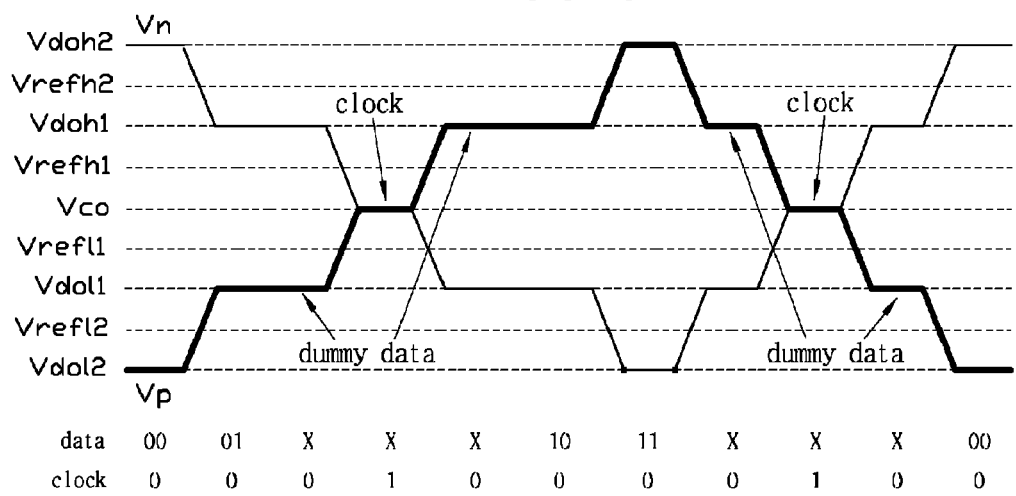
[Fig. 15]

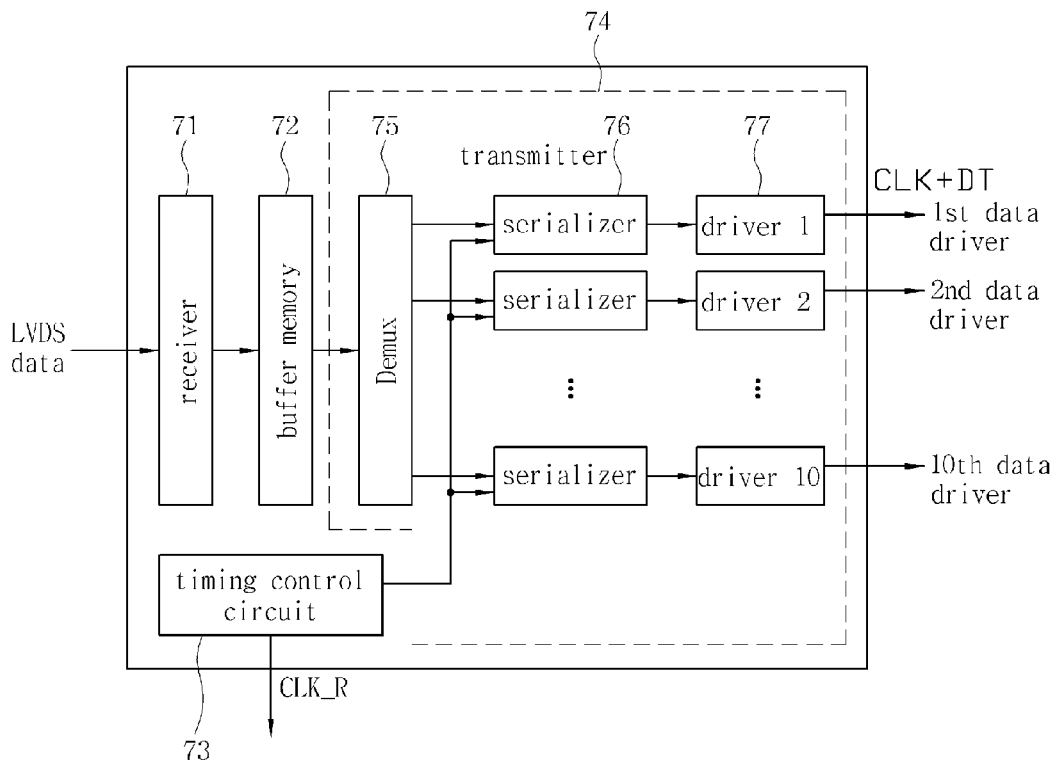
[Fig. 16]
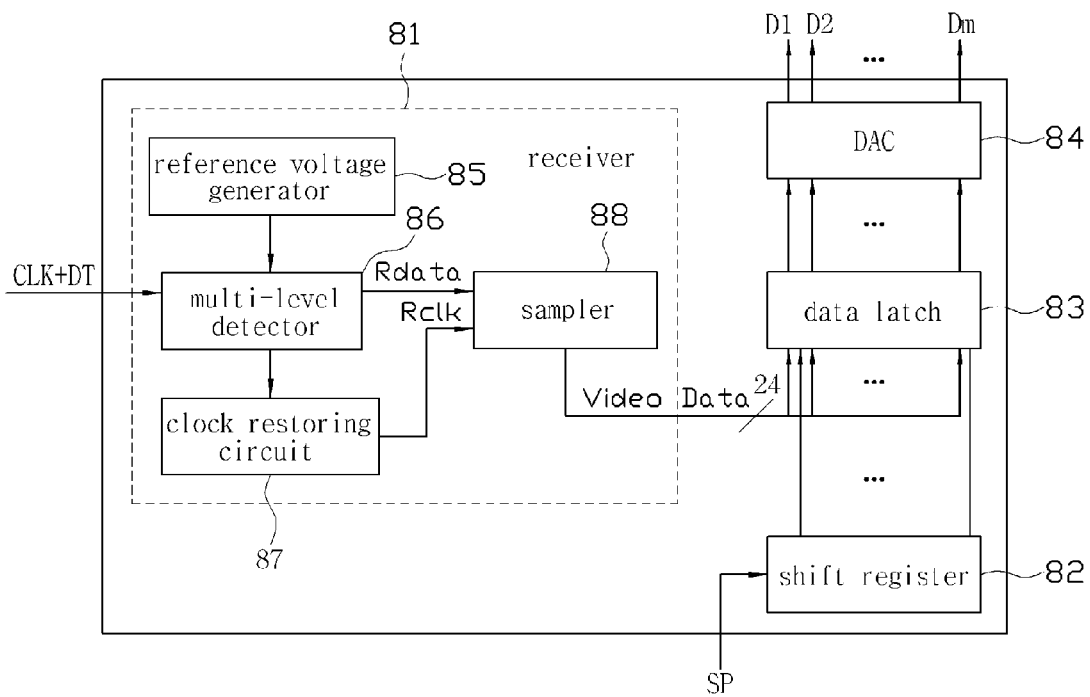
[Fig. 17]

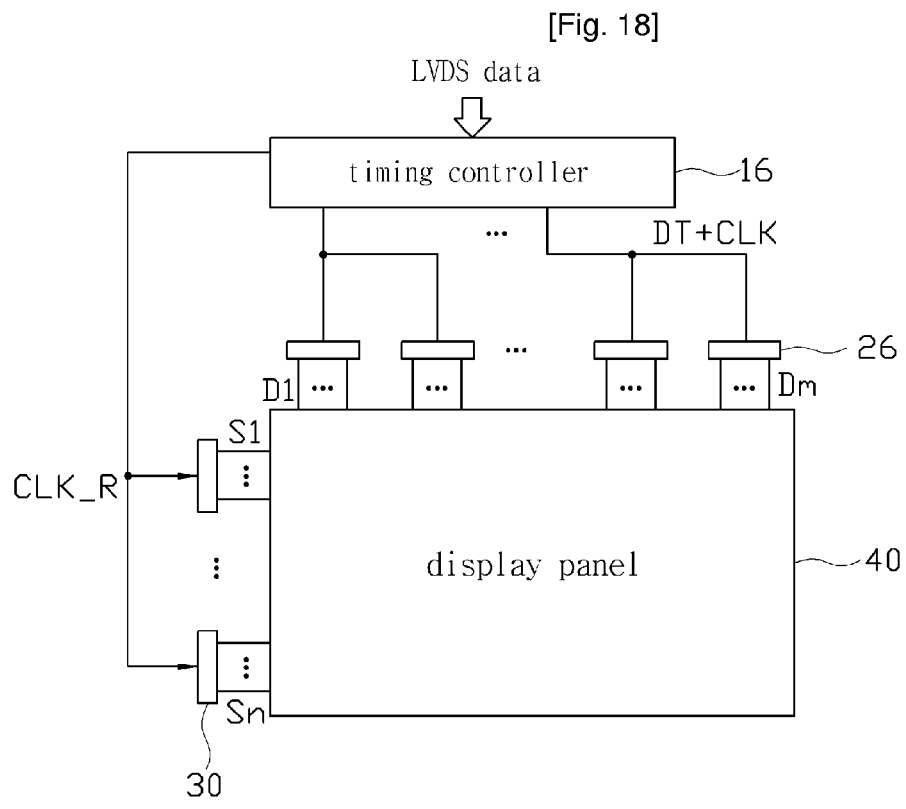
[Fig. 18]
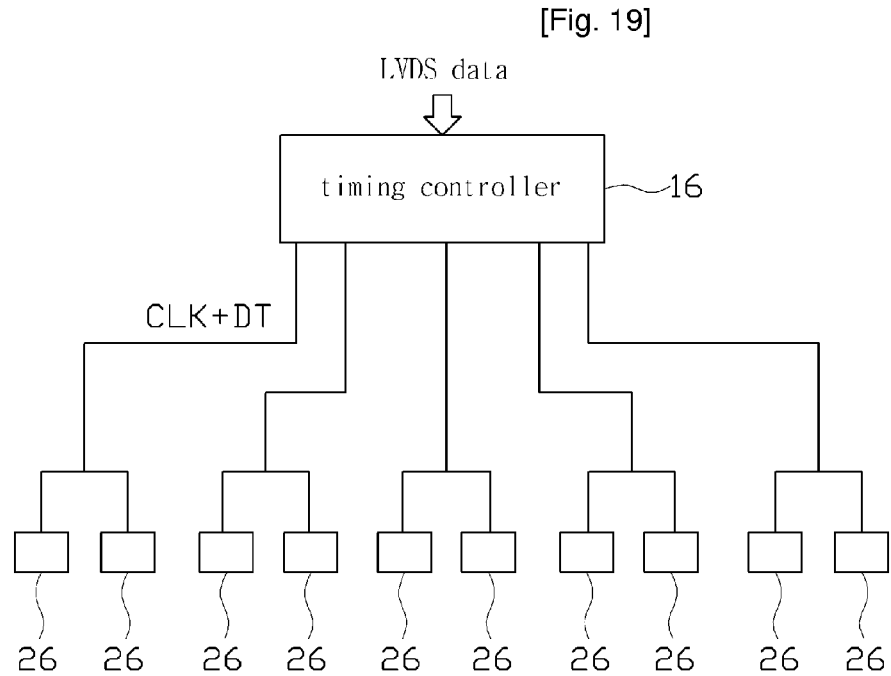
[Fig. 19]

DISPLAY, TIMING CONTROLLER AND DATA DRIVER FOR TRANSMITTING SERIALIZED MULTI-LEVEL DATA SIGNAL

The present application claims priority to Korean Patent Application No. 10-2006-0026565 (filed on Mar. 23, 2006), Korean Patent Application No. 10-2006-0041920 (filed on May 10, 2006), and PCT Patent Application PCT/KR2006/002351 (filed Jun. 20, 2006), which are hereby incorporated by reference in their entireties.

TECHNICAL FIELD

The present invention relates to a display, a timing controller and a data driver for transmitting a serialized multi-level data signal, and more particularly to a display, a timing controller and a data driver for transmitting a serialized multi-level data signal for reducing the number of wirings between the timing controller and the data driver, and for reducing an EMI component.

BACKGROUND ART

Recently, in addition to an increase in a popularization of portable electronic devices such as a notebook computer and a personal portable communication device, a market size of digital appliances and personal computers is constantly increased. Display apparatuses which are final connection medium between such devices and users is required to have a light weight and low power consumption. Therefore, FPDs (Flat Panel Displays) such as an LCD (Liquid Crystal Display), a PDP (Plasma Display Panel) and an OELD (Organic Electro-Luminescence Display) are generally used instead of a conventional CRT (Cathode Ray Tube).

As described above, in case of generalized FPD system, a timing controller, a scan controller and a data driver are required for driving a panel that is used for actual display. However, a large amount of an EMI (electromagnetic interference) and an RFI (radio frequency interference) hereinafter commonly referred to as "EMI") are generated in a line for transmitting a data signal between the timing controller and the data driver.

Moreover, in case of current FPD system, a large screen and a high resolution are constantly pursued, and in case of a high resolution panel in particular, since the number of a data line runs from few hundreds to few thousands, an input to the data driver for driving each of the data lines requires a high speed data transmission technology.

As described above, since an EMI standard is reinforced recently, and a technology for transmitting a signal in a high speed is far more required, a small signal differential signaling scheme such as an RSDS (Reduced Swing Differential Signaling) or a mini-LVDS is commonly used in an intra-panel display for connecting the timing controller and the data driver accordingly.

FIG. 1 is a schematic diagram illustrating an embodiment of a conventional RSDS(Reduced Swing Differential Signaling), and FIG. 2 is a schematic diagram illustrating an embodiment of a conventional mini-LVDS (Low Voltage Differential Signaling). The RSDS and mini-LVDS both comprise one or more data signal lines to meet a required bandwidth using a separate clock signal synchronized to a data signal. Since only one clock signal is used, the clock signal and the data signals must be provided to match the number of data drivers 20 and 21 inside the panel. That is, as shown in FIGS. 1 and 2, the RSDS and the mini-LVDS both employ a multi-drop method.

However, the multi-drop method employed by both the RSDS and the mini-LVDS is disadvantageous in that a maximum operating speed limited due to a large load of the clock signal as well as an increase in EMI and degradation of quality of the signal such as a signal distortion due to impedance mismatch at a point where lines are split.

An intra-panel interface employing a point-to-point scheme recently announced by National Semiconductor Corporation is a PPDS (Point-to-Point Differential Signaling). In accordance with this method shown in FIG. 3, clock signals are transmitted to each of data drivers 22 to solve a problem that occurs when the clock signal is shared by the data driver 22. Moreover, this method is characterized in that an independent data line is disposed a timing controller and a single data driver 22 while a plurality of data lines are connected to a plurality of data drivers conventionally. That is, as shown in FIG. 3, in case of the PPDS, a serial method is employed to a single independent data line is disposed from a PPDS timing controller 12 toward the single data driver 22.

Therefore, the impedance mismatch is reduced compared to the conventional multi-drop method employed by the RSDS and the mini-LVDS so that EMI is reduced and a low manufacturing cost is achieved by reducing the number of total signal line.

DISCLOSURE OF INVENTION

Technical Problem

However, a higher speed clock signal compared to the conventional RSDS is required, and separate clock lines are connected to all of the data drivers respectively so that an overhead exists. Moreover, when a skew between a clock signal for sampling data and a data signal exists, an error may occur during a data sampling process. In order to prevent this, a separate circuit for compensating the skew is necessary. In addition, a frequency of the serialized data signal transmitted from the timing controller 21 to the data driver 22 is increased due to an increase in the resolution, resulting in an increase in the EMI component. Therefore, the PPDS has problems different from the conventional RSDS and the mini-LVDS that should be solved.

In addition, as shown in FIG. 4, a configuration wherein a data driver 23 receives a clock signal in a chain form has been recently proposed. Such configuration is advantageous in that an impedance mismatch due to a multi-drop of a clock line and a resulting EMI can be reduced. However, this configuration is problematic that a data sampling is failed due to a delay of a clock occurring between the data driver 23.

As described above, the latest trend in the intra-panel interface is focused on reducing the number of signal lines and EMI component. In addition, an operating speed and a resolution of a panel are increased compared with the reduction of the number of signal lines so that a novel intra-panel interface that can solve problems such as the skew, the relative jitter and the EMI occurring during a high speed signal transmission process is required.

Technical Solution

It is an object of the present invention to provide a display, a timing controller and a data driver wherein a serialized multi-level data is transmitted from the timing controller to the data driver to reduce an operating frequency and an EMI component.

It is another object of the present invention to provide a display, a timing controller and a data driver wherein a multi-level data and an embedded clock signal having a level different from that of the multi-level data as well as only the multi-level data is transmitted using a single wiring (two wirings when a differential signaling is used) connecting the timing controller and the data driver to reduce the number of the wirings, the EMI component, and solve a skew or a relative jitter problem.

In addition, It is yet another object of the present invention to provide a display, a timing controller and a data driver wherein a dummy data is inserted immediately before or after an embedded clock signal to maintain a rising time and a falling time and to reduce a possibility of a jitter generation, thereby allowing the display to operate stably at high transmission speed.

In accordance with first aspect of the present invention, there is provided a display comprising a display panel, a scan driver, a timing controller and a plurality of data drivers, wherein the timing controller transmits a transmission signal including a serialized data signal to one of the plurality of the data drivers, wherein a level of the data signal is selected from at least four different levels according to a value of a data having a length of at least two bits, and wherein the data driver restores the data from the transmitted transmission signal. Preferably, the transmission signal comprises a clock signal embedded between the data signal, and a level of the embedded clock signal differs from the at least four different levels of the data signal.

In accordance with second aspect of the present invention, there is provided a timing controller comprising: A receiver for receiving a data; a buffer memory for temporarily storing and outputting the received data; a timing control circuit for generating a clock signal; and a transmitter for outputting a plurality of transmission signals, wherein each of the plurality of the transmission signals comprises a serialized data signal corresponding thereto, and wherein a level of the data signal is selected of at least four different levels according to a value of the data having a length of at least two bits. Preferably, each of the plurality of the transmission signals further comprises the clock signal embedded between the data signal, and a level of the embedded clock signal differs of the at least four different levels of the data signal.

In accordance with third aspect of the present invention, there is provided a data driver comprising: a receiver for restoring a data by sampling a data signal included in a received signal according to a received clock signal; a data latch for sequentially storing the data and outputting the data in parallel; and a DAC for converting the data outputted by the data latch to an analog signal to be outputted, wherein the receiver determines a range a level of the data signal belongs to of at least four different ranges whereby the data of at least two bits is restored simultaneously from the data signal according to the determination. Preferably, the received signal further comprises a clock signal embedded between the data signal, and the receiver determines whether the range the level of the data signal belongs to a predetermined range different from the at least four different ranges whereby the received clock signal is restored from the embedded clock signal.

BRIEF DESCRIPTION OF THE DRAWINGS

FIG. 5 is a diagram illustrating a structure of a display in accordance with a first embodiment of the present invention.

FIG. 6 is a diagram illustrating only transmission structures of a clock and a data between a timing controller and data drivers of FIG. 5.

FIG. 7 is a diagram illustrating an example of a multi-level signaling to be used in an interface between the timing controller and the data driver of FIG. 5.

FIG. 8 is a diagram illustrating an example of the timing controller 14 to be used in the display of FIG. 5.

FIG. 9 is a diagram illustrating an example of the data driver 24 to be used in the display of FIG. 5.

FIG. 10 is a diagram illustrating a structure of a display in accordance with a second embodiment of the present invention.

FIG. 11 is a diagram illustrating only transmission structures of a clock signal and a data signal between a timing controller and data drivers of FIG. 10.

FIGS. 12 through 15 are diagrams illustrating examples of a multi-level signaling to be used in an interface between the timing controller and the data driver of FIG. 10.

FIG. 16 is a diagram illustrating an example of the timing controller to be used in the display of FIG. 10.

FIG. 17 is a diagram illustrating an example of the data driver to be used in the display of FIG. 10.

FIG. 18 is a diagram illustrating a structure of a display in accordance with a third embodiment of the present invention.

FIG. 19 is a diagram illustrating only transmission structures of a clock signal and a data signal between a timing controller and data drivers of FIG. 18.

BEST MODE FOR CARRYING OUT THE INVENTION

Figure 1:
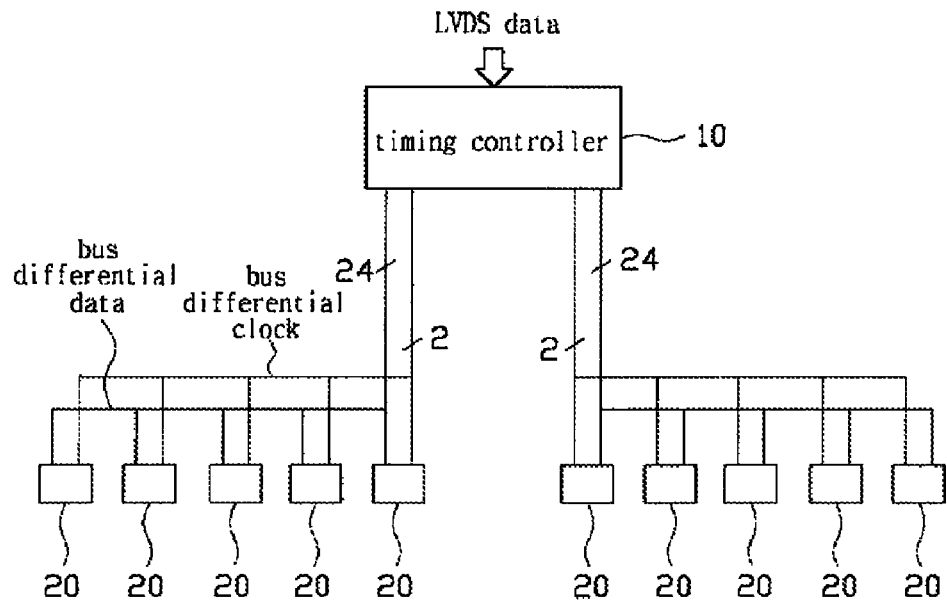
FIG. 1 is a schematic diagram illustrating an embodiment of a conventional RSDS(Reduced Swing Differential Signaling).
Figure 2:
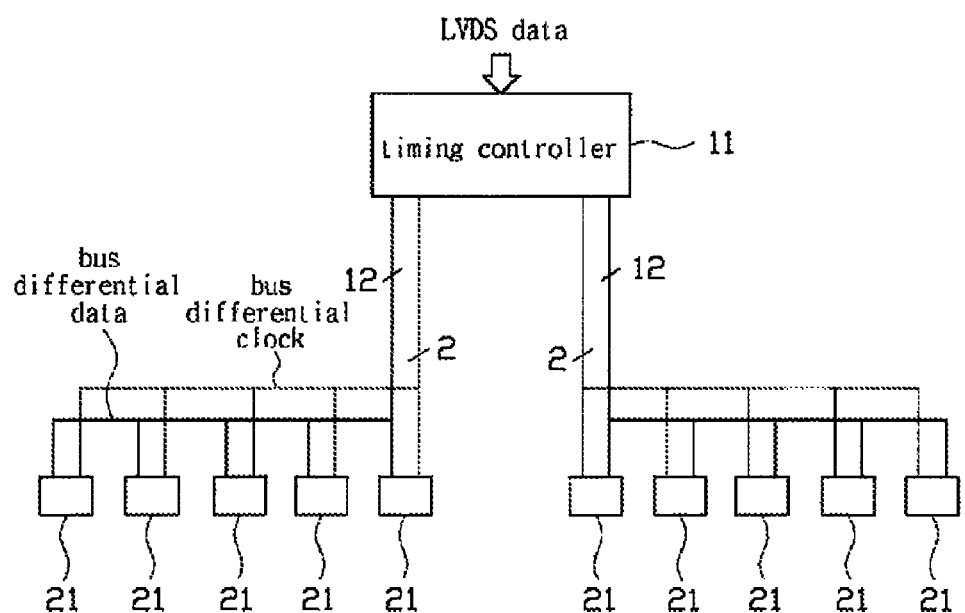
FIG. 2 is a schematic diagram illustrating an embodiment of a conventional miniLVDS (Low Voltage Differential Signaling).

The present invention will now be described in detail with reference to the accompanied drawings. The interpretations of the terms and wordings used in Description and Claims should not be limited to common or literal meanings. The interpretation should be made to meet the meanings and concepts of the present invention based on the principle that the inventor or inventors may define the concept of the terms so as to best describe the invention thereof. Therefore, while the present invention has been particularly shown and described with reference to the preferred embodiment thereof, it will be understood by those skilled in the art that various changes in form and details may be effected therein without departing from the spirit and scope of the invention as defined by the appended claims.

[First Embodiment]

FIG. 5 is a diagram illustrating a structure of a display in accordance with a first embodiment of the present invention, and FIG. 6 is a diagram illustrating only transmission structures of a clock and a data between a timing controller and data drivers of FIG. 5. Referring to FIGS. 5 and 6, the display comprises a timing controller 14, data drivers 24, scan drivers 30 and a display panel 40.

The display panel 40 display an image according to scan signals S1 through Sn and data signals D1 through Dm. the display panel 40 may comprise different types of display panels such as an LCD panel, a PDP panel or an OLED panel.

The scan drivers 30 apply the scan signals S1 through Sn to the display panel 40, and the data driver 24 apply the data signals D1 through Dm to the display panel 40. The timing controller 14 transmits a data signal DT to the data driver 24, and applies clock signals CLK and CLK_R to the data driver 24 and the scan driver 30.

The data signal DT transmitted from the timing controller 14 to the data driver 24 may only comprises an image data to be displayed on the display panel 40, or may comprise the image data and a control signal. A single-ended signaling wherein a single wiring is used or a differential signaling wherein two wirings are used such as the LVDS may be employed as a scheme for transmitting the data signal DT from the timing controller 14 to the data driver 24.

Figure 3:
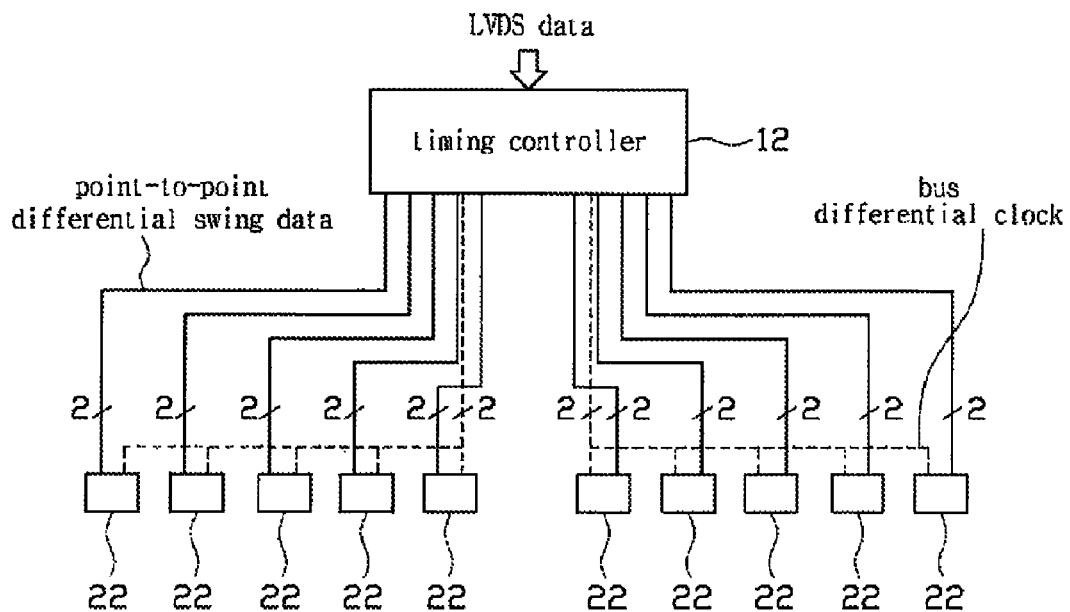
FIG. 3 is a schematic diagram illustrating an embodiment of a conventional PPDS (Point-to-Point Differential Signaling).
Figure 4:
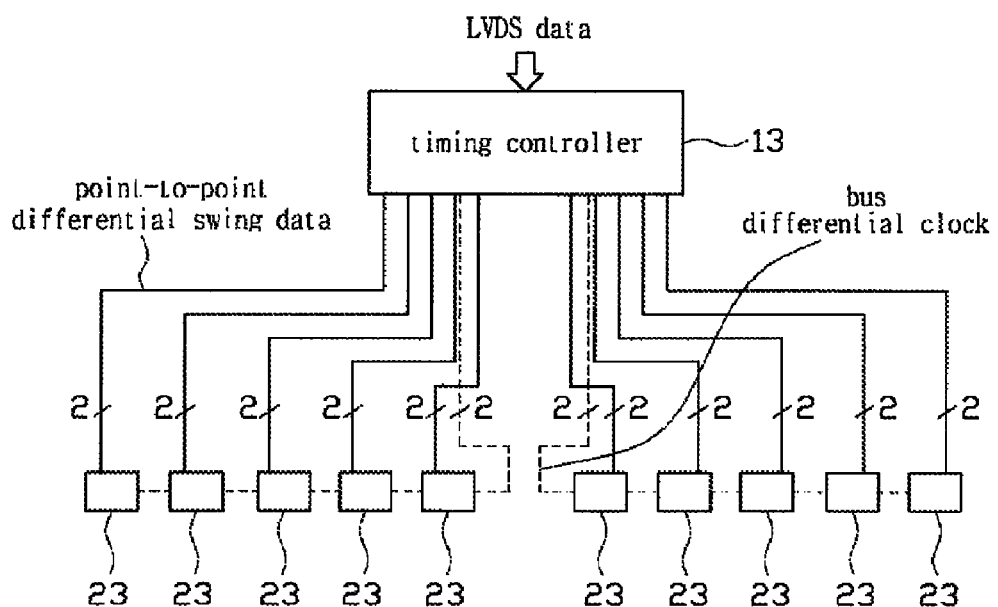
FIG. 4 is a schematic diagram illustrating a method for receiving a clock signal in series from a neighboring data driver in the RSDS in series wherein the column driving circuit is configured to have a chain structure.

While the display in accordance with the first embodiment of the present invention employs a scheme similar to the conventional PPDS method shown in FIG. 3, the present invention characterizes in that the data signal DT is transmitted via a multi-level signaling scheme contrary to the conventional method in order to reduce an operating frequency and the EMI component. More specifically, contrary to the conventional method wherein a data of only one bit may be transmitted simultaneously due to the fact that the data signal DT has only two levels, the display in accordance with the first embodiment of the present invention employs the data signal DT having at least four levels to transmit a data of at least two bits simultaneously. When the timing controller 14 is to transmit a data of two bits simultaneously, a frequency of the data signal DT is reduced to one half compared to the conventional method. Since the EMI increases as the frequency is increased, the EMI is reduced when the frequency of the data signal DT is reduced.

In order to transmit the data signal DT by the multi-level signaling scheme, the timing controller 14 generates the data signal DT having a level corresponding to a value of the data of two or more bits. The data signal DT may have at least four different levels. In addition, the data driver 24 restores an original data from the data signal DT transmitted from the timing controller 14.

FIG. 7 is a diagram illustrating an example of a multi-level signaling to be used in an interface between the timing controller and the data driver of FIG. 5, wherein the data of two bits is transmitted using the data signal DT having four levels via two wirings using the differential signaling such as the LVDS. When the single-ended signaling method instead of the differential signaling scheme is used to transmit the multi-level data, only a signal corresponding to a reference numeral Vp may be transmitted through the single wiring.

Referring to FIGS. 5, 6 and 7, when the timing controller 14 is to transmit a data corresponding to a binary '00', the timing controller 14 outputs a data signal Vp having a level corresponding to 'Vdol2'. When the timing controller 14 is to transmit a data corresponding to a binary '01', the timing controller 14 outputs a data signal Vp having a level corresponding to 'Vdol1'. When the timing controller 14 is to transmit a data corresponding to a binary '10', the timing controller 14 outputs a data signal Vp having a level corresponding to 'Vdoh1'. When the timing controller 14 is to transmit a data corresponding to a binary '11', the timing controller 14 outputs a data signal Vp having a level corresponding to 'Vdoh2'. When the differential signaling scheme is used, the timing controller 14 outputs 'Vp' through one of the wiring of the two wirings for transmitting the data, and outputs 'Vn' having a polarity opposite to that of 'Vp' through the remaining wiring. As described, since the timing controller 14 may output four different levels, the data of two bits may be transmitted simultaneously. When the timing controller 14 is capable of outputting more than four levels, a data of more than two bits may be transmitted simultaneously. For instance, when the timing controller 14 is capable of outputting more than eight levels, a data of more than three bits may be transmitted simultaneously.

The data driver 24 determines a range to which a level of the received data signal DT belongs, and restores the original data from the received data signal. As shown, when the level of the received data signal Vp is no more than 'Vrefl1', the data driver 24 determines that the data corresponding to the binary '00' is received. When the level of the received data signal Vp is more than 'Vrefl1' and no more than 'Vos', the data driver 24 determines that the data corresponding to the binary '01' is received. When the level of the received data signal Vp is more than 'Vos' and no more than 'Vrefh1', the data driver 24 determines that the data corresponding to the binary '10' is received. When the level of the received data signal Vp is more than 'Vrefh1', the data driver 24 determines that the data corresponding to the binary '11' is received. When the differential signaling scheme is used, the data driver 24 determines a range to which a level of 'Vn' belongs as well as that of 'Vp' to restore the original data from the received data signal or determines a level to which 'Vp-Vn' belongs to restore the original data from the received signal.

FIG. 8 is a diagram illustrating an example of the timing controller 14 to be used in the display of FIG. 5. Referring to FIG. 8, the timing controller comprises a receiver 51, a buffer memory 52, a timing control circuit 53 and a transmitter 54.

The receiver 51 receives a transmitted data. In addition, the receiver 51 may also receive a transmitted control signal. More specifically, the receiver 51 converts the image data signal and a received control signal inputted to the timing controller into a TTL (transistor-transistor logic) signal. The received signal inputted to the timing controller is not limited to a LVDS type signal, and may be a TMDS (transition minimized differential signaling) type signal or any other type of signals. The TTL signal commonly refers to a signal converted to a digital signal, and has a large voltage amplitude contrary to the LVDS signal having a small voltage amplitude of 0.35V.

The buffer memory 52 outputs the received data after temporarily storing the received data.

The timing control circuit 53 receives the received control signal converted to the TTL signal, and generates a clock signal CLK_R to be transmitted to the scan driver and a clock signal CLK to be transmitted to the data driver.

The transmitter 54 receives a data outputted by the buffer memory 52 and outputs a plurality of transmission signals to be transmitted to the plurality of the data drivers. Each of the plurality of the transmission signals comprises a serialized data signal, and a level of the data signal is selected of at least four different levels according to a value of the data having a length of at least two bits.

The transmitter 54 comprises a de-multiplexer 55, a plurality of serializers 56 and a plurality of drivers 57, the de-multiplexer 55 transmits the image data outputted by the buffer memory 52 to the plurality of the serializers 56 by dividing the image data according to each of the plurality of the data drivers. The plurality of the serializers 56 serializes the data transmitted from the de-multiplexer 55. For instance, when the serializer 56 receives a parallel data of twenty four bits (eight bits of red, eight bits of green and eight bits of blue) corresponding to a single pixel from the de-multiplexer 55, the serializer 56 transmits the data of twenty four bits by two bits for twelve times to the driver 57. The drivers 57 generates a data signal DT having a level corresponding to the serialized data outputted by the serializer 56. That is, the driver 57 converts the inputted serialized data to an analog signal. The signal outputted by the driver 57 may be the differential signaling scheme such as the LVDS or the single ended signaling type.

FIG. 9 is a diagram illustrating an example of the data driver 24 to be used in the display of FIG. 5. Referring to FIG. 9, the data driver comprises a receiver 61, a shift register 62 and a DAC (digital-to-analog converter) 64.

The receiver 61 restores the data by sampling the data signal DT included in the received signal according to the received clock signal CLK. The receiver 61 determines a range to which a level of the data signal DT belongs of the at least four different ranges to restore at least the data of two bits simultaneously from the data signal DT according to the determination.

The receiver 61 comprises a reference voltage generator 65, a multi-level detector 66 and a sampler 67. The reference voltage generator 65 generates a reference voltage used as a basis for dividing the at least four different ranges. For instance, when the signal (the signal of the differential signaling or the single-ended signaling) shown in FIG. 7 is transmitted, the reference voltage generator 65 may output 'Vrefl1', 'Vos' and 'Vrefh1' as the reference voltage. For another instance, when the differential signal shown in FIG. 7 is transmitted and the data is restored from the data signal DT by determining a range to which 'Vp'–'Vn' belongs, the reference voltage generator 65 may output 'Vrefh1'-'Vrefl1', zero and 'Vrefl1'-'Vrefh1' as the reference voltage. The multi-level detector 66 determines a range to which the level of the data signal DT belongs using the reference voltages outputted by the reference voltage generator 65. The sampler 67 samples and outputs the signal outputted by the multi-level detector 66 as the received clock signal CLK. As shown, the sampler 67 sequentially stores each of the restored data of two bits, and may output the parallel data of twenty four bits corresponding to the single pixel to the data latch 63.

The shift register 62 sequentially shifts and outputs a start pulse SP.

The data latch 63 sequentially stores the data outputted by the receiver according to a signal outputted by the shift register 62, and then outputs the data in parallel.

The DAC 64 converts a digital signal outputted by the data latch 63 to an analog signal.

[Second Embodiment]

FIG. 10 is a diagram illustrating a structure of a display in accordance with a second embodiment of the present invention, and FIG. 11 is a diagram illustrating only transmission structures of a clock signal and a data signal between a timing controller and data drivers of FIG. 10. Referring to FIGS. 10 and 11, the display comprises a timing controller 15, data drivers 25, scan drivers 30 and a display panel 40.

The display in accordance with the second embodiment of the present invention is similar to that of the first embodiment. However, the display in accordance with the second embodiment of the present invention differs from that of the first embodiment in that the clock signal CLK is embedded in the data signal DT to have a level different from that of the data signal. More specifically, the data signal DT may have at least four different levels, and the embedded clock signal has a level different from the levels of the data signal DT. The clock signal CLK may be embedded for each data signal DT, or for a plurality of the data signals DT.

In order to achieve this, the timing controller 15 generates a transmission signal wherein the clock signal CLK is embedded between the data signal DT to be transmitted to the data driver 25. The data signal DT has a level corresponding to a value of a data of more than two bits, and the clock signal CLK has the level different from the levels of the data signal DT. The data driver 25 restores the clock signal and the data from the transmission signal transmitted from the timing controller 15. The data driver 25 determines a range to which a level of the transmission signal belongs to restore the clock signal and the data.

When the transmission signal is transmitted via the single-ended signaling, the timing controller 15 and the data driver 25 may be connected via a single wiring. When the transmission signal is transmitted via the differential signaling, the timing controller 15 and the data driver 25 may be connected via two wirings.

FIG. 12 is a diagram illustrating an example of a multi-level signaling to be used in an interface between the timing controller and the data driver of FIG. 10, wherein the two wirings are used to transmit the transmission signal via the differential signaling such as the LVDS. When the single-ended signaling method instead of the differential signaling scheme is used to transmit the multi-level data, a signal corresponding to a reference numeral Vp may be transmitted through the single wiring. In addition, one clock signal CLK is embedded for every four data signals DT, the data signal DT may have four levels, and the embedded clock CLK may have two levels as shown.

Referring to FIGS. 10 and 12, when the timing controller 15 is to transmit a data corresponding to a binary '00', the timing controller 15 outputs a data signal Vp having a level corresponding to 'Vdol2'. When the timing controller 15 is to transmit a data corresponding to a binary '01', the timing controller 15 outputs a data signal Vp having a level corresponding to 'Vdol1 '. When the timing controller 15 is to transmit a data corresponding to a binary '10', the timing controller 15 outputs a data signal Vp having a level corresponding to 'Vdoh1'. When the timing controller 15 is to transmit a data corresponding to a binary '11', the timing controller 15 outputs a data signal Vp having a level corresponding to 'Vdoh2'. When the timing controller 15 is to transmit the clock signal, the timing controller 15 outputs an embedded clock signal 'Vp' having a level corresponding to 'Vcol' or 'Vcoh'. When the differential signaling scheme is used, the timing controller 15 outputs 'Vp' through one of the wiring of the two wirings for transmitting the data, and outputs 'Vn' having a polarity opposite to that of 'Vp' through the other wiring. As described, since the timing controller 15 may output four different levels, the data of two bits may be transmitted simultaneously. In addition, since the timing controller 15 may output the embedded clock signal having two different levels, the timing controller 15 may transmit the clock signal CLK and a control signal simultaneously. More specifically, when the timing controller 15 is to transmit the clock signal CLK and a control signal corresponding to a logic value '0', the timing controller 15 outputs the embedded clock signal 'Vp' having the level corresponding to 'Vcol'. When the timing controller 15 is to transmit the clock signal CLK and a control signal corresponding to a logic value '1', the timing controller 15 outputs the embedded clock signal 'Vp' having the level corresponding to 'Vcoh'. As described above, when the embedded clock signal CLK has a plurality of levels, the control signal may be transmitted simultaneously with the embedded clock signal CLK. The control signal, for example, may be a start pulse.

The data driver 25 determines a range to which a level of the received data signal belongs, and restores the original data and the clock signal from the received data signal. As shown, when the level of the received data signal Vp is no more than 'Vrefl2', the data driver 25 determines that the clock signal and the control signal corresponding to logic value of '0' are received. When the level of the received data signal Vp is more than 'Vrefl2' and no more than 'Vrefl1', the data driver 25 determines that the data corresponding to the binary '00' is received. When the level of the received data signal Vp is more than 'Vrefl1' and no more than 'Vos', the data driver 25 determines that the data corresponding to the binary '01' is received. When the level of the received data signal Vp is more than 'Vos' and no more than 'Vrefh1', the data driver 25 determines that the data corresponding to the binary '10' is received. When the level of the received data signal Vp is more than 'Vrefh1' and no more than 'Vrefh2', the data driver 25 determines that the data corresponding to the binary '11' is received. When the level of the received data signal Vp is more than 'Vrefh2', the data driver 25 determines that the clock signal and the control signal corresponding to logic value of '1' are received. When the differential signaling is used, the data driver 25 determines a range to which a level of 'Vn' belongs as well as that of 'Vp', and restores the original data and the clock signal from the received data signal. In addition, the data driver 25 determines a level to which 'Vp-Vn' belongs to restore the original data and the clock signal.

While the two outermost levels Vcol and Vcoh of the six levels Vcol, Vdol2, Vdol1, Vdoh1, Vdoh2 and Vcoh shown in FIG. 12 are levels of the clock signal CLK, the levels of the clock signal CLK is not limited to the outermost levels. For instance, the clock signal CLK may have the levels corresponding to Vdoh2 and Vdoh1, and the data signal DT may have the rest of the levels.

FIG. 13 is a diagram illustrating another example of a multi-level signaling to be used in an interface between the timing controller and the data driver of FIG. 10, wherein one clock signal CLK is embedded for every data signal DT, the data signal DT may have four levels, and the embedded clock CLK may have a single level as shown.

Referring to FIGS. 10 and 13, when the timing controller 15 is to transmit a data corresponding to a binary '00', the timing controller 15 outputs a data signal Vp having a level corresponding to 'Vdol2'. When the timing controller 15 is to transmit a data corresponding to a binary '01', the timing controller 15 outputs a data signal Vp having a level corresponding to 'Vdol1'. When the timing controller 15 is to transmit a data corresponding to a binary '10', the timing controller 15 outputs a data signal Vp having a level corresponding to 'Vdoh 1'. When the timing controller 15 is to transmit a data corresponding to a binary '11', the timing controller 15 outputs a data signal Vp having a level corresponding to 'Vdoh2'. When the timing controller 15 is to transmit the clock signal, the timing controller 15 outputs an embedded clock signal 'Vp' having a level corresponding to 'Vco' (a level that corresponds to '0'). As described, the timing controller 15 may transmit the transmission signal wherein the clock signal CLK is embedded between the data signal DT. Since the timing controller 15 outputs the embedded clock signal having a single level, the control signal cannot be outputted simultaneously with the clock signal CLK.

The data driver 25 determines a range to which a level of the received data signal belongs, and restores the original data and the clock signal from the received data signal. As shown, when the level of the received data signal Vp is no more than 'Vrefl2', the data driver 25 determines that the data corresponding to the binary '00' is received. When the level of the received data signal Vp is more than 'Vrefl2' and no more than 'Vrefl1', the data driver 25 determines that the data corresponding to the binary '01' is received. When the level of the received data signal Vp is more than 'Vrefl1' and no more than 'Vrefh2', the data driver 25 determines that the data corresponding to the binary '10' is received. When the level of the received data signal Vp is more than 'Vrefh2', the data driver 25 determines that the data corresponding to the binary '11' is received. The data driver 25 determines a range to which a level of 'Vn' belongs as well as that of 'Vp' to restore the original data and the clock signal from the received data signal. In addition, the data driver 25 determines a level to which 'Vp-Vn' belongs to restore the original data and the clock signal.

While the innermost level Vco of the five levels Vdol2, Vdol1, Vco, Vdoh1 and Vdoh2 shown in FIG. 12 is a level of the embedded clock signal CLK, the level of the embedded clock signal CLK is not limited to the innermost levels. For instance, the clock signal CLK may have the level corresponding to Vdoh1, and the data signal DT may have the rest of the levels.

FIG. 14 is a diagram illustrating yet another example of a multi-level signaling to be used in an interface between the timing controller and the data driver of FIG. 10, wherein the embedded clock signal CLK has two levels and a dummy data is positioned immediately before and after the embedded clock signal CLK.

Referring to FIGS. 10 and 14, a polarity of the embedded clock signal may be identical to that of a data signal immediately before the embedded clock signal. As shown, the embedded clock signal has a negative polarity which is identical to that of the data signal (data signal corresponding to two bit '01') immediately before the embedded clock signal, and the embedded clock signal has a positive polarity which is identical to that of the data signal (data signal corresponding to two bit '11') immediately before the embedded clock signal. In addition, contrary to FIG. 14, the embedded clock signal may have a polarity corresponding to that of the control signal. The dummy data may be positioned immediately before and after the embedded clock signal. The dummy data immediately before and after the embedded clock signal maintains a rising time and a falling time of the embedded clock signal. Accordingly, the dummy data immediately before and after the embedded clock signal have a polarity identical to that of the embedded clock signal, and has a level closest to the embedded clock signal ('Vdoh2' or 'Vdol2'). When there is no dummy data immediately before and after the embedded clock signal, the rising time and the falling time of the embedded clock signal may vary according to which level of 'Vdoh2', 'Vdoh1', 'Vdol1' and 'Vdol2' of the data signal immediately before and after the embedded clock signal is. Therefore, a jitter may be generated.

FIG. 15 is a diagram illustrating yet another example of a multi-level signaling to be used in an interface between the timing controller and the data driver of FIG. 10, wherein the clock signal CLK has a single level, and a dummy data is positioned immediately before and after the embedded clock signal CLK. The dummy data may be positioned immediately before and after the embedded clock signal. The dummy data immediately before and after the embedded clock signal maintains a rising time and a falling time of the embedded clock signal. Accordingly, the dummy data immediately before and after the embedded clock signal have a polarity identical to that of the embedded clock signal, and has a level closest to the embedded clock signal ('Vdoh1' or 'Vdol1'). In addition, the dummy data immediately before the embedded clock signal may have a polarity identical to that of a data signal immediately before the embedded clock signal, the dummy data immediately after the embedded clock signal may have a polarity identical to that of a data signal immediately after the embedded clock signal. When there is no dummy data immediately before and after the embedded clock signal, the rising time and the falling time of the embedded clock signal may vary according to which level of 'Vdoh2', 'Vdoh1', 'Vdol1' and 'Vdol2' of the data signal immediately before and after the embedded clock signal is. Therefore, a jitter may be generated.

FIG. 16 is a diagram illustrating an example of the timing controller to be used in the display of FIG. 10 referring to FIG. 10, the timing controller comprises a receiver 71, a buffer memory 72, a timing control circuit 73 and a transmitter the transmitter 74.

The receiver 71 receives a transmitted data. In addition, the receiver 71 may also receive a transmitted control signal. More specifically, the receiver 71 converts the image data and a received control signal inputted to the timing controller into a TTL (transistor-transistor logic) signal. The received signal inputted to the timing controller is not limited to a LVDS type signal, and may be a TMDS (transition minimized differential signaling) type signal or any other type of signals.

The buffer memory 72 outputs the received data after temporarily storing the received data.

The timing control circuit 73 receives the received control signal converted to the TTL signal, and generates a clock signal CLK_R to be transmitted to the scan driver. The timing control circuit 73 also generates a clock signal to be used in the transmitter 74.

The transmitter 74 receives a data outputted by the buffer memory 72 and the clock signal outputted by the timing control circuit 73, and outputs a transmission signal to be transmitted to the plurality of data drivers. The transmission signal comprises a serialized data signal DT and the clock signal embedded between the serialized data signal DT, and a level of the data signal is selected of at least four different levels according to a value of the data having a length of at least two bits. The embedded clock signal has a level different from those of the data signal. The transmitter 74 may embed the clock signal for each of the data signals or for a plurality of the data signals. In addition, the embedded clock signal CLK may have a plurality of levels or a single level. When the embedded clock signal CLK has the plurality of the levels, the clock signal CLK may have a level selected from the plurality of the levels according to the control signal.

The transmitter 74 comprises a de-multiplexer 75, a plurality of serializers 76 and a plurality of drivers 77, the de-multiplexer 75 transmits the image data outputted by the buffer memory 72 to the plurality of the serializers 76 by dividing the image data according to each of the plurality of the data drivers. The plurality of the serializers 76 serializes the data transmitted from the de-multiplexer 75, and embeds the clock signal between the serialized data signals. The serializer 76 may add the dummy data immediately before or after the clock signal. The drivers 77 generates a transmission signal having a level corresponding to the serialized data and the clock signal outputted by the serializer 76. That is, the driver 77 converts the inputted serialized data and the clock signal to an analog signal. The signal outputted by the driver 77 may be the differential signaling scheme such as the LVDS or the single ended signaling type.

FIG. 17 is a diagram illustrating an example of the data driver to be used in the display of FIG. 10. Referring to FIG. 17, the data driver comprises a receiver 81, a shift register 82, a data latch 83 and a DAC (digital-to-analog converter) 84.

The receiver 81 restores and outputs the data and the clock signal from the received signal transmitted from the timing controller. The receiver 81 determines a range to which a level of the received signal belongs from a plurality of ranges to restore the clock signal and the data. More specifically, the receiver 81 determines a range a level of the received signal belongs to of at least four different ranges to simultaneously restore the data of at least two bits from the received signal. The receiver 81 determines whether the level of the received signal belongs to a predetermined range corresponding to the clock signal to restore the clock signal from the received signal. The predetermined range corresponding to the clock signal differs of the at least four different ranges corresponding to the data. The predetermined range corresponding to the clock signal may be divided into a plurality of different ranges, and in this case, the receiver 81 determines to which of the plurality of the levels the received signal belongs to restore the control signal from the received signal. The control signal may be a start pulse SP. The received signal may comprise a signal wherein the clock signal is embedded for each of the data signals or for the plurality of the data signals.

The receiver 81 comprises a reference voltage generator 85, a multi-level detector 86, a clock restoring circuit 87, and a sampler 88.

The reference voltage generator 85 generates a reference voltage used as a basis for dividing the at least four different ranges. For instance, when the signal (the signal of the differential signaling or the single-ended signaling) shown in FIG. 12 is transmitted, the reference voltage generator 85 may output 'Vrefl2', 'Vrefl1', 'Vos', 'Vrefh1' and 'Vrefh2' as the reference voltage. For another instance, when the differential signal shown in FIG. 12 is transmitted and the data is restored from the data signal DT by determining a range to which 'Vp'–'Vn' belongs, the reference voltage generator 85 may output 'Vrefh2'-'Vrefl2', 'Vrefh1'-'Vrefl1', zero, 'Vrefl1'-'Vrefh1', and 'Vrefl2'-'Vrefh2' as the reference voltage.

The multi-level detector 86 determines a range to which the level of the data signal DT belongs using the reference voltages outputted by the reference voltage generator 85. The multi-level detector 86 then outputs a result of the determination to the clock restoring circuit 87 and the sampler 88. More specifically, the multi-level detector 86 determines whether the received signal has a level corresponding to the embedded clock signal to restore the clock signal and output the restored clock signal to the clock restoring circuit 87. The multi-level detector 86 also determines to which level of the data signal the level of the received signal belongs and outputs a result of the determination to the sampler 88.

The clock restoring circuit 87 generates a clock signal Rclk used for a sampling of the data signal from the restored clock signal CLK. The clock restoring circuit 87 may comprise, for example, a PLL (Phase-Locked Loop) or a DLL (Delay-Locked Loop), and may generate the clock signal Rclk used for the sampling having a high frequency from the received clock signal CLK having a low frequency. Or the clock restoring circuit 87 may generate and transmit a plurality of the clock signal Rclk having the same frequency as and different phases to the inputted clock signal CLK without increasing the frequency. For instance, when the data of twenty four bits is transmitted by two bits for twelve times, the clock restoring circuit 87 transmits twelve clock signals having the different phases to the sampler 88, and the sampler sequentially samples the data of twenty four bits using the twelve clock signals to be transmitted to the data latch 83. As shown FIG. 13, when the frequency of the received clock signal CLK matches that of the data signal, the receiver 81 may not comprise the clock restoring circuit 87, and in this case, the clock signal CLK outputted by the multi-level detector 86 is directly inputted to the sampler 88.

The sampler 88 samples and outputs the signal outputted by the multi-level detector 86 as the clock signal Rclk. As shown, the sampler 88 sequentially stores each of the restored data of two bits, and may output the parallel data of twenty four bits corresponding to the single pixel to the data latch 83.

The shift register 82 sequentially shifts and outputs the start pulse SP.

The data latch 83 sequentially stores the data outputted by the receiver according to a signal outputted by the shift register 82, and then outputs the data in parallel.

The DAC 84 converts a digital signal outputted by the data latch 83 to an analog signal.

[Third Embodiment]

FIG. 18 is a diagram illustrating a structure of a display in accordance with a third embodiment of the present invention, and FIG. 19 is a diagram illustrating only transmission structures of a clock signal and a data signal between a timing controller 16 and data drivers 26 of FIG. 18.

The third embodiment of the present invention employs a point-to-couple scheme while the second embodiment and the third embodiment of the present invention employs the point-to-point scheme. Since the third embodiment of the present invention is basically identical to the second embodiment except that the third embodiment employs the point-to-couple scheme, the multi-level signaling that may be used for an interface between the timing controller and the data driver described with reference to FIGS. 10 through 17 may also be used for the third embodiment. However, while a single transmission signal is transmitted to a single data driver in accordance with the second embodiment, a single transmission signal is transmitted to two data drivers in accordance with the third embodiment. Therefore, the frequency of the transmission signal of the third embodiment is increased to have twice the frequency of the transmission signal of the second embodiment.

The display panel of the present invention may comprise various display panels wherein the multi-level signaling scheme in accordance with the present invention may be used between the timing controller and the data driver such as TFT-LCD (TFT Liquid Crystal Display), STN-LCD, Ch-LCD, FLCD, PDP (Plasma Display Panel), OELD (Organic Electro-Luminescence Display) and FED.

While description is focused on a single wiring of the single-ended signaling or a pair of wirings of differential signaling for connecting the timing controller and the data driver, two or more wirings of the single-ended signaling or two or more pair of wirings of differential signaling for connecting the timing controller and the data driver should not be excluded.

Industrial Applicability

As described above, The display, the timing controller and the data driver in accordance with the present invention is advantageous in that a serialized multi-level data is transmitted from the timing controller to the data driver to reduce an operating frequency and an EMI component.

In addition, The display, the timing controller and the data driver in accordance with the present invention is advantageous in that a transmission signal wherein a clock signal is embedded between multi-level data is transmitted from the timing controller to the data driver to reduce the number of the wirings, the EMI component, and solve a skew or a relative jitter problem.

Moreover, the display, the timing controller and the data driver in accordance with the present invention is advantageous in that a dummy data is inserted immediately before or after an embedded clock signal to maintain a rising time and a falling time and to reduce a possibility of a jitter generation, thereby allowing the display to operate stably at high transmission speed.

The invention claimed is:

1. An apparatus comprising a display panel, a scan driver, a timing controller, and a plurality of data drivers, wherein:
the timing controller is configured to transmit a transmission signal to one of said plurality of data drivers;
the transmission signal comprises a serialized data signal;
the serialized data signal having at least four levels representing at least two bits; and
the data driver is configured to restore the data from the transmitted transmission signal.

2. The apparatus of claim 1, wherein said plurality of data drivers are configured to restore data transmitted in the serialized data signal by determining ranges corresponding to said at least four levels in the transmitted transmission signal.

3. The apparatus of claim 1, wherein the transmission signal comprises a clock signal embedded between the serialized data signal.

4. The apparatus of claim 3, wherein a level of the embedded clock signal differs from said at least four levels of the serialized data signal.

5. The apparatus of claim 4, wherein said one of said plurality of data drivers is configured to restore the clock signal by determining ranges of the transmitted transmission signal.

6. The apparatus of claim 4, wherein a level of the embedded clock signal is one of at least two different levels according to a value of a control signal.

7. The apparatus of claim 4, wherein the transmission signal comprises dummy data inserted at least one of immediately before the embedded clock signal and immediately after the embedded clock signal to maintain at least one of a rising time and a falling time of the embedded clock signal.

8. The apparatus of claim 7, wherein:
the embedded clock signal has two levels having different polarities;
the dummy data has a polarity identical to that of the embedded clock signal; and
the dummy data is at a level corresponding to said at least four levels of the serialized data signal such that the level of the dummy data corresponds to the level of the embedded clock signal.

9. The apparatus of claim 7, wherein:
the embedded clock signal has a level corresponding to zero;
the dummy data has a level selected from the at least four different levels corresponding to the levels of the data signal such that the selected level of the dummy data corresponds to the level of the embedded clock,
the dummy data has the same polarity as the serialized data signal immediately before the embedded clock signal when the dummy data is inserted immediately before the embedded clock signal; and
the dummy data has the same polarity as the serialized data signal immediately after the embedded clock signal when the dummy data is inserted immediately after the embedded clock signal.

10. The apparatus of claims 3, wherein at least one of:
the transmission signal is transmitted via single-ended signaling using a single wiring connecting the timing controller and said one of said plurality of data drivers; and
the transmission signal is transmitted via differential signaling using two wirings connecting the timing controller and said one of said plurality of the data drivers.

11. The apparatus of claim 10, comprising at least one of a single wiring and two wirings for transmitting an additional transmission signal between the timing controller and said one of said plurality of data drivers via at least one of the single-ended signaling or the differential signaling.

12. The apparatus of claims 3, wherein the timing controller is connected to said plurality of data drivers via a point-to-point scheme.

13. The apparatus of claims 3, wherein the timing controller is connected to said plurality of data drivers via a point-to-couple scheme.

14. The apparatus of claims 3, wherein the timing controller embeds the clock signal for each of said serialized data signal.

15. The apparatus of claims 3, wherein:

said serialized data signal is comprised in a plurality of serialized data signals; and the timing controller embeds the serialized clock signal for the plurality of serialized data signals.

* * * * *